(12) United States Patent
Chuang

(10) Patent No.: US 7,588,135 B1
(45) Date of Patent: Sep. 15, 2009

(54) ROLLER MOUNT FOR A ROLLER OF A CONVEYER

(75) Inventor: William Chuang, Shulin (TW)

(73) Assignee: Worldwide Logistics Corporation, Shulin, Taipei Hsien (TW)

( * ) Notice: Subject to any disclaimer, the term of this patent is extended or adjusted under 35 U.S.C. 154(b) by 0 days.

(21) Appl. No.: 12/144,588

(22) Filed: Jun. 23, 2008

(51) Int. Cl.
*B65G 13/00* (2006.01)

(52) U.S. Cl. ............... 193/35 R; 193/37; 198/860.1

(58) Field of Classification Search .............. 198/860.1, 198/861.1, 780, 782; 193/35 R, 37; 492/16, 492/47
See application file for complete search history.

(56) References Cited

U.S. PATENT DOCUMENTS

| | | | | |
|---|---|---|---|---|
| 3,353,644 A | * | 11/1967 | McNash et al. | 193/37 |
| 4,056,180 A | * | 11/1977 | Gunti | 193/35 J |
| 5,657,854 A | * | 8/1997 | Chen et al. | 198/787 |
| 6,042,061 A | * | 3/2000 | Shimizu | 193/37 |
| 6,076,647 A | * | 6/2000 | Agnoff | 193/37 |
| 7,228,952 B2 | * | 6/2007 | Kanaris | 193/37 |
| 2003/0038014 A1 | * | 2/2003 | Itoh et al. | 193/37 |

* cited by examiner

*Primary Examiner*—James R Bidwell
(74) *Attorney, Agent, or Firm*—patenttm.us

(57) ABSTRACT

A roller mount for a roller of a conveyer has an axle, multiple holding panels, and a fastener. The holding panels are mounted around a connecting end of the axle, and each has a positioning hole and a securing hole. The positioning hole has a diameter larger than that of the connecting end of the axle. At least one pair of male-female combination is defined between each pair of adjacent holding panels. A distance between an uppermost one pair of the at least one male-female combination and the positioning hole in one of a corresponding pair of adjacent holding panels is different that between the uppermost pair of male-female combination and the positioning hole in the other of the pair of adjacent holding panels. The fastener is mounted through the aligning securing holes in the holding panels.

16 Claims, 7 Drawing Sheets

US 7,588,135 B1

ROLLER MOUNT FOR A ROLLER OF A CONVEYER

BACKGROUND OF THE INVENTION

1. Field of the Invention

The present invention relates to a roller mount, and more particularly to a roller mount for a roller of a conveyer.

2. Description of Related Art

With reference to FIG. 5, a conveyer substantially comprises a base (80) and multiple rollers (81) rotatably mounted on the base to deliver objects, wherein some of the rollers (81) are powered. To rotatably mount the rollers (81) on the base (80), multiple roller mounts are mounted on the base (80). With further reference to FIGS. 6 and 7, a conventional roller mount comprises an axle (82), a securing board (90), two positioning panels (91,92) and two fasteners. The axle (82) is rotatably connected with a roller (81) and has a connecting end with a hexagonal cross section. The securing board (90) is securely mounted on the base (80) and has a hexagonal positioning hole (901) mounted around the connecting end of the axle (82). Two convex protrusions (902) formed on one side of the securing board (90) respectively at two sides of the positioning hole (901). Each protrusion (902) has a through hole (903) defined through the protrusion (902).

Each holding panel (91,92) has a hexagonal positioning hole (911,921) aligning with each other and the positioning hole (901) in the securing board (90) and mounted around the connecting end of the axle (82). Two through holes (912,922) are defined through each holding panel (91,92) and align respectively with the through holes (903) in the securing board (90). The protrusions (902) on the securing board (90) are partially mounted respectively in the through holes (912, 922) in the holding panels (91,92).

The fasteners are mounted respectively through the through holes (903,912,922) in the securing board (90) and the holding panels (91,92) and each comprises a bolt (93) and a nut (94). The bolt (93) is mounted through the aligning through holes (903,912,922) in the securing board (90) and the holding panels (91,92) and is screwed with the nut (94). Accordingly, the securing board (90) and the holding panels (91,92) are combined securely together with the fasteners, and the connecting end of the axle (82) is held securely in the positioning holes (901,911,921) in the securing board (90) and the holding panels (91,92).

However, the positioning holes (901,911,921) in securing board (90) and the holding panels (91,92) have a same size in dimension, the holding effect applied to the connecting end of the axle (82) is limited. When a large force or vibration being applied to the roller (81) or the axle (82), the connecting end of the axle (80) easily detaches or escapes from the positioning holes (901,911,921). Additionally, two fasteners are needed for the conventional roller mount, so to assemble or disassemble the conventional roller mount is time-consuming.

To overcome the shortcomings, the present invention tends to provide a roller mount to mitigate or obviate the aforementioned problems.

SUMMARY OF THE INVENTION

The main objective of the invention is to provide a roller mount for a roller of a conveyer and that can provide an excellent holding effect to the roller and is easily assembled.

The roller mount for a roller of a conveyer has an axle, multiple holding panels, and a fastener. The axle has a connecting end with a polygonal cross section and is adapted to rotatably connected with the roller. The holding panels are mounted around the connecting end of the axle, and each holding panel has a positioning hole and a securing hole. The positioning hole is defined through the holding panel, is polygonal corresponding to the cross section of the connecting end and has a diameter larger than that of the connecting end of the axle. The securing hole is defined through the holding panel, and the securing holes in the holding panels align with each other. At least one pair of male-female combination is defined between each pair of adjacent holding panels. A distance between an uppermost one pair of the at least one male-female combination and the positioning hole in one of a corresponding pair of adjacent holding panels is different that between the uppermost pair of male-female combination and the positioning hole in the other of the pair of adjacent holding panels. The fastener is mounted through the aligning securing holes in the holding panels.

Other objects, advantages and novel features of the invention will become more apparent from the following detailed description when taken in conjunction with the accompanying drawings.

DETAILED DESCRIPTION OF PREFERRED EMBODIMENT

Figure 1:
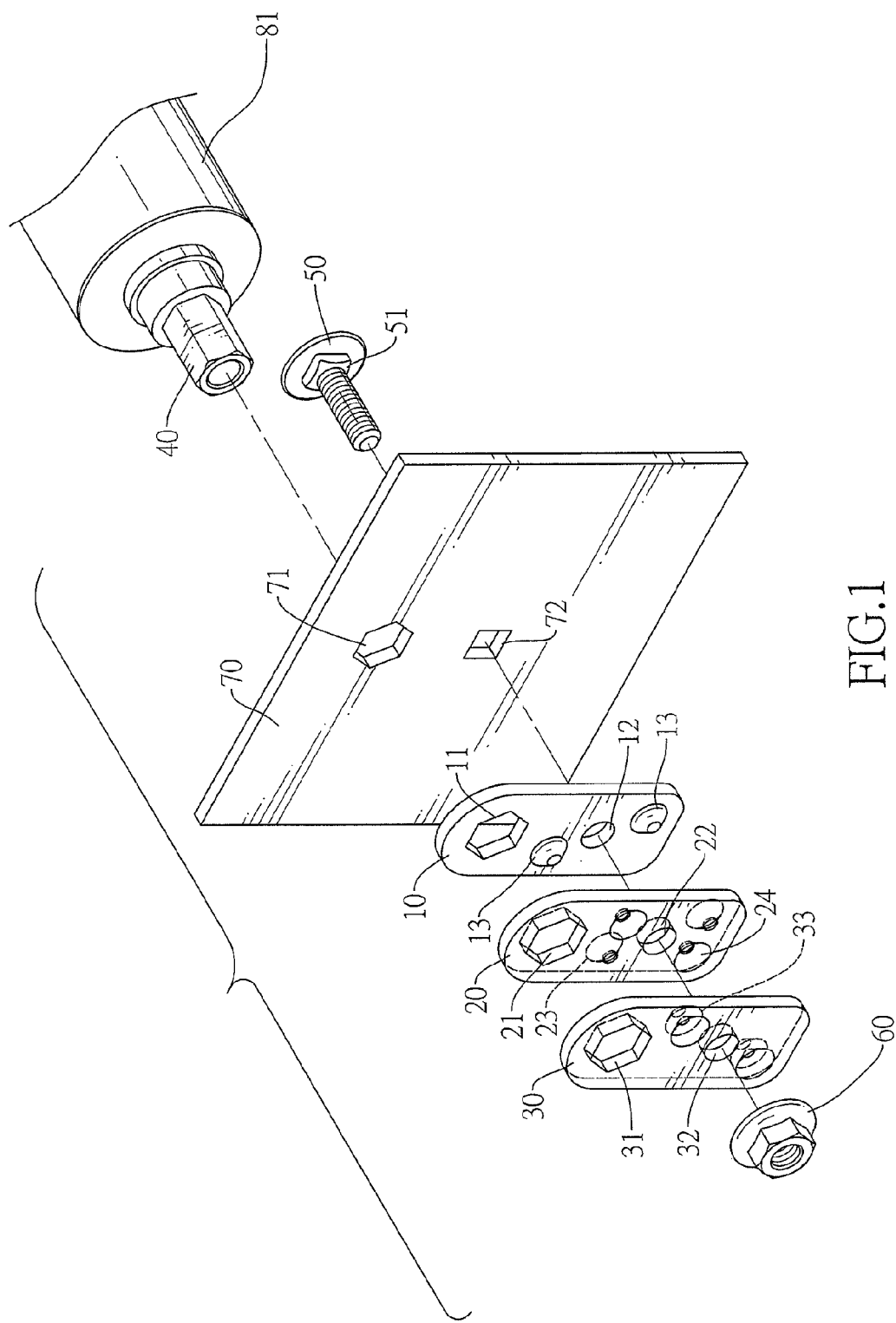
FIG. 1 is an exploded perspective view of a roller mount for a roller of a conveyer in accordance with the present invention.
Figure 2:
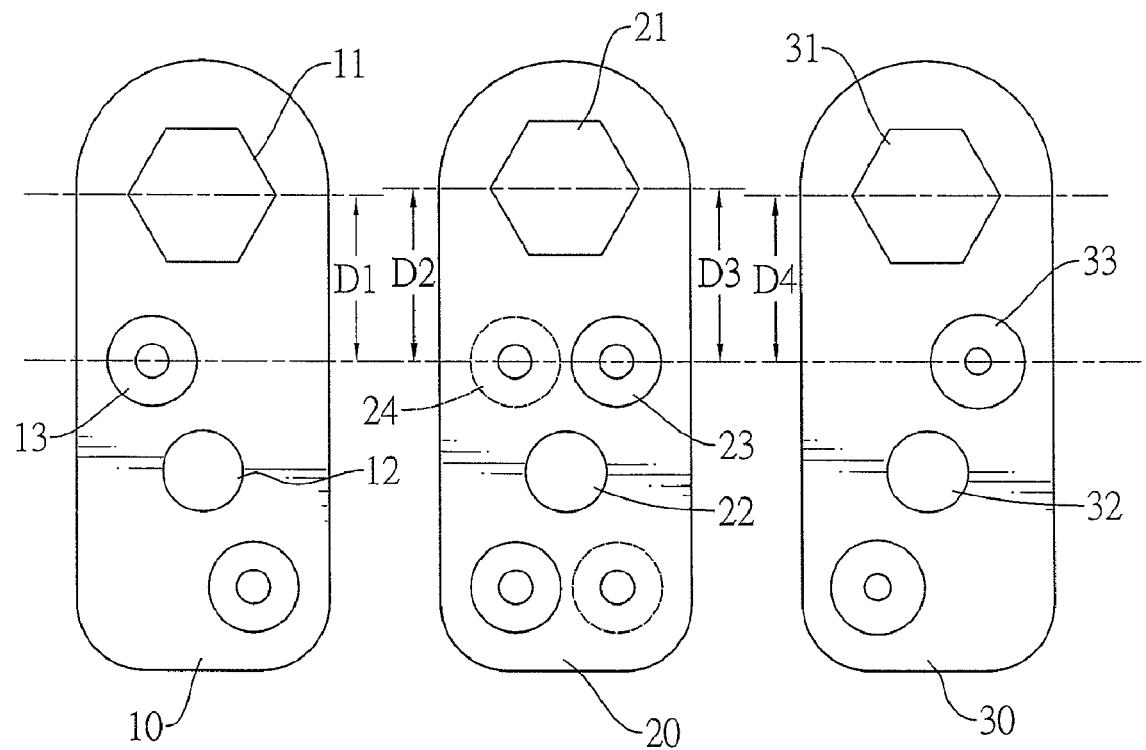
FIG. 2 is a front view of the holding panels of the roller mount in FIG. 1.
Figure 3:
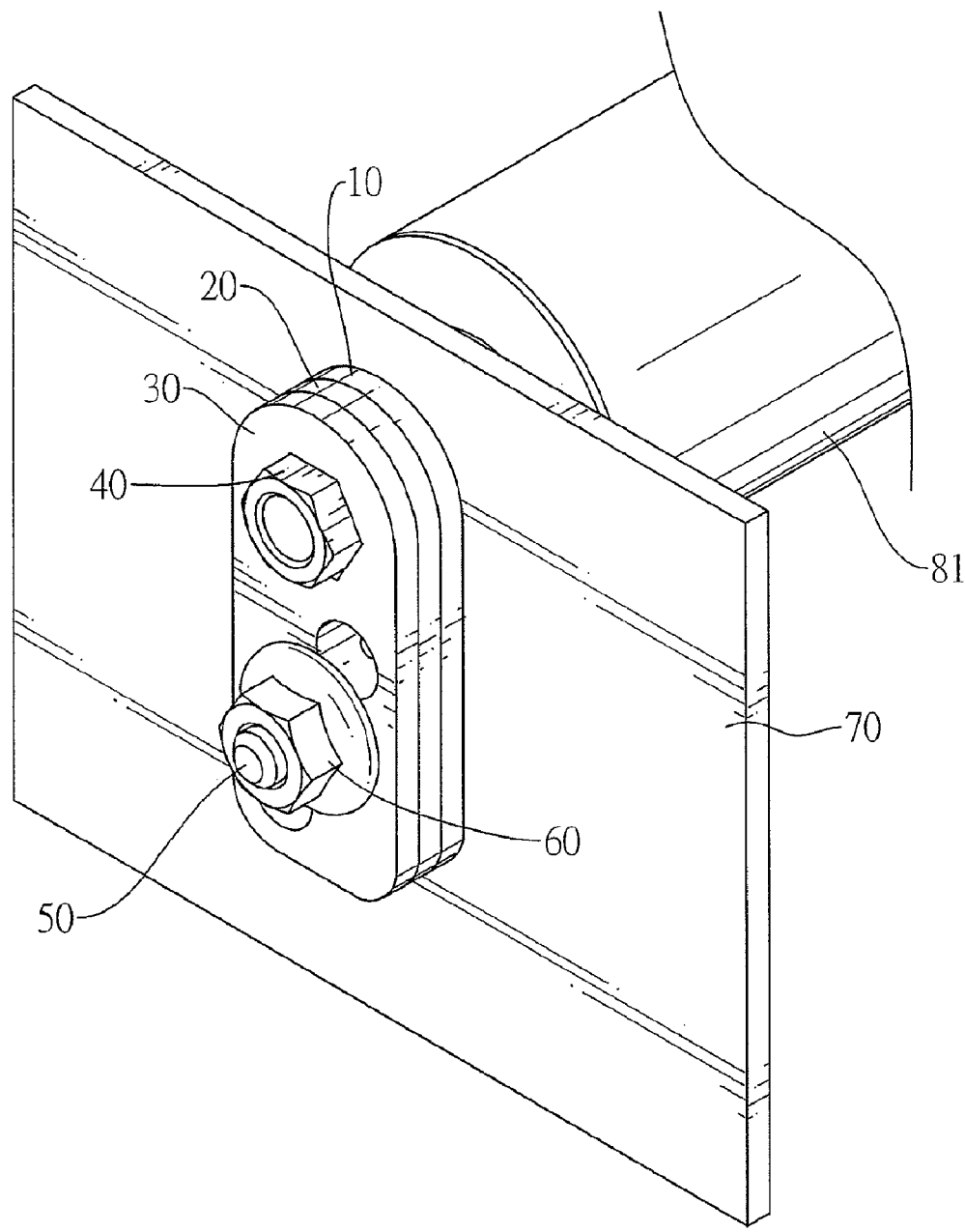
FIG. 3 is a perspective view of the roller mounted in FIG. 1.

With reference to FIGS. 1 to 4, a roller mount for a roller (81) of a conveyer in accordance with the present invention comprises an axle (40), multiple holding panels (10,20,30) and a fastener.

The axle (40) is rotatably connected with the roller (81) and has a connecting end with a polygonal cross section.

The holding panels (10,20,30) are mounted around the connecting end of the axle (40) to securely support the connecting end of the axle (40) and connect the axle (40) to a base (70) of the conveyer. In a preferred embodiment, the roller mount has three holding panels (10,20,30) including a first holding panel (10), a second holding panel (20) and a third holding panel (30). The second holding panel (20) is mounted and squeezed between the first and third holding panels (10, 30).

Figure 4:
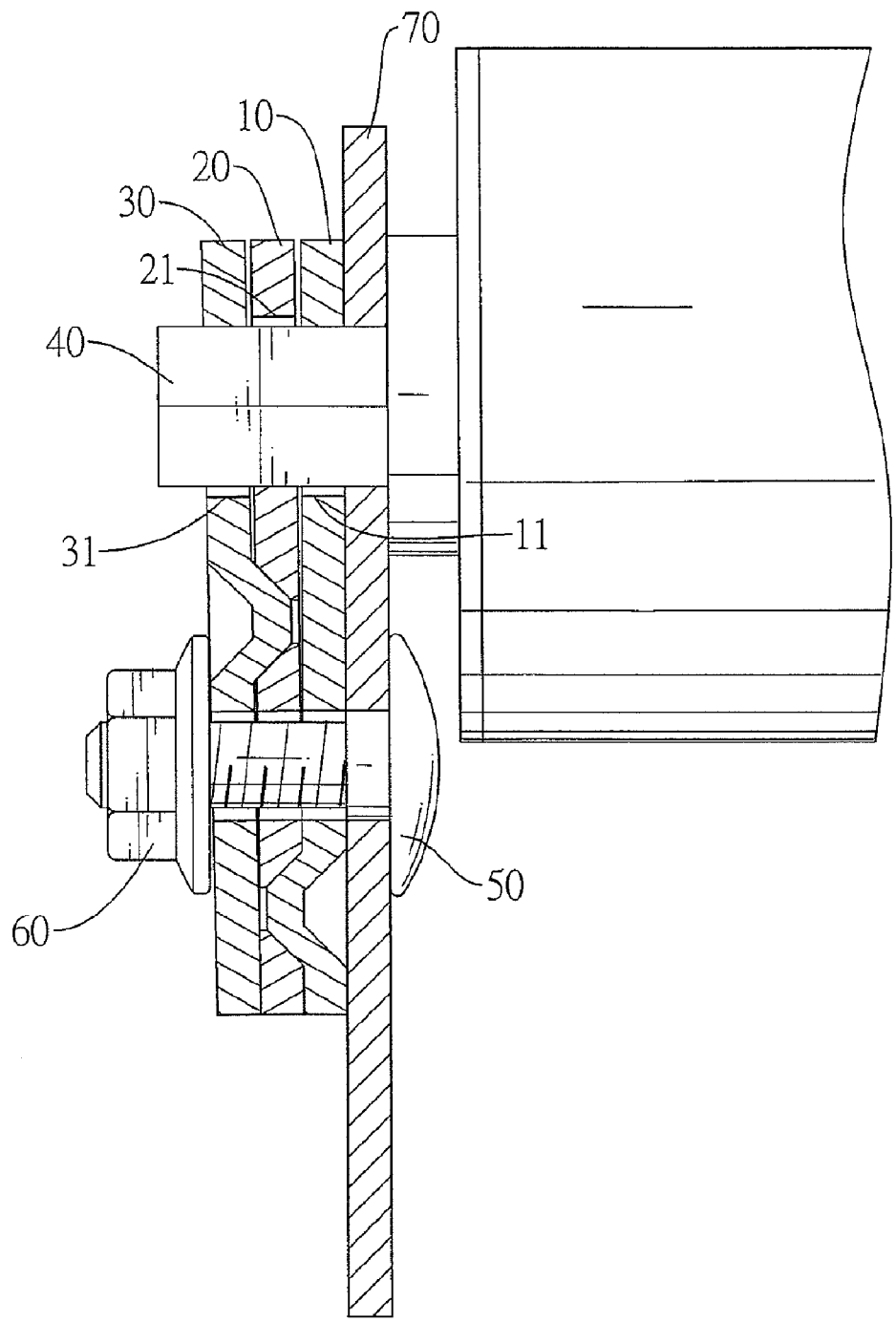
FIG. 4 is a side view in partial section of the roller mount in FIG. 3.
Figure 5:
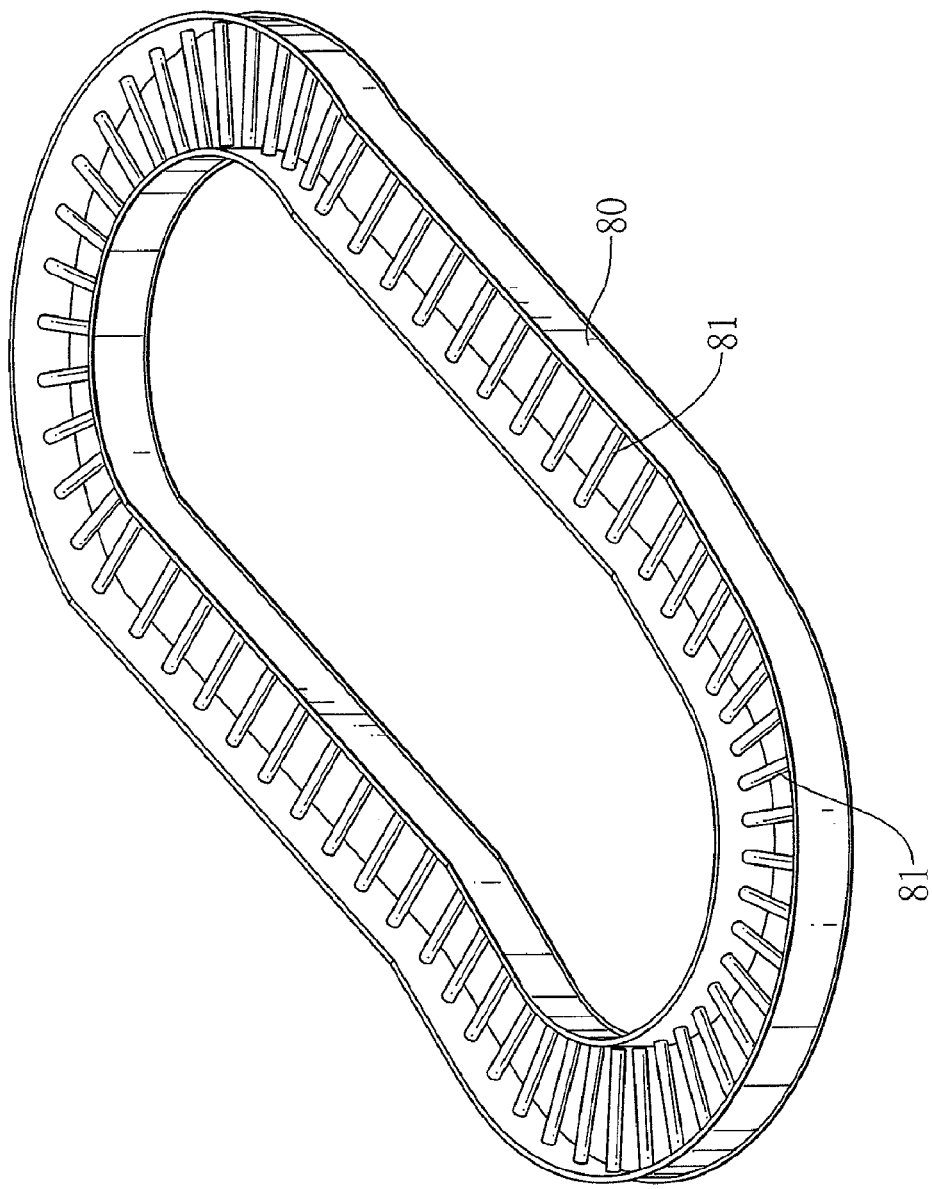
FIG. 5 is a perspective view of a conveyer in accordance with the prior art.
Figure 6:
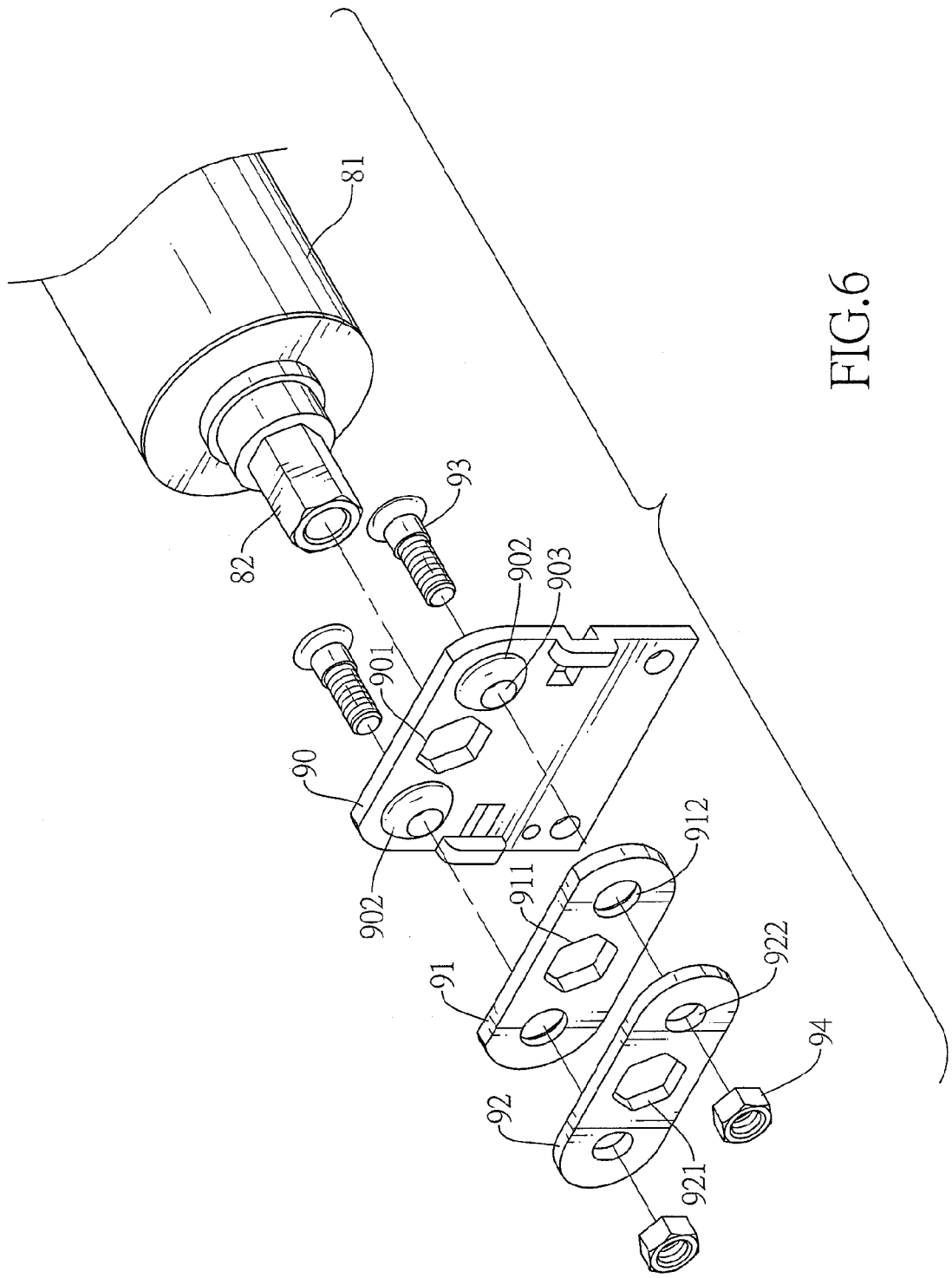
FIG. 6 is an exploded perspective view of a conventional roller mount in accordance with the prior art.
Figure 7:
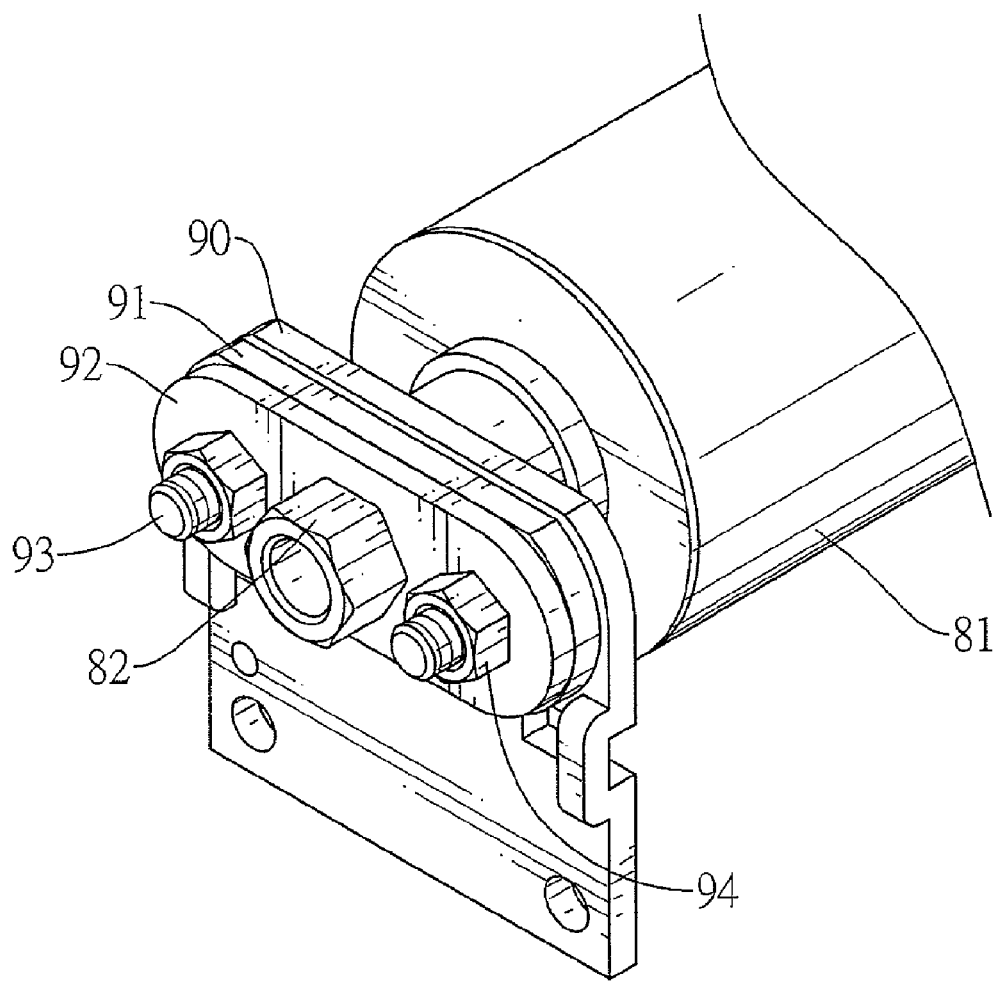
FIG. 7 is a perspective view of the roller mount in FIG. 6.

Each holding panel (10,20,30) has a positioning hole (11, 21,31) and a securing hole (12,22,32). The positioning hole (11,21,31) is defined through the holding panel (10,20,30), is polygonal corresponding to the cross section of the connecting end and may be hexagonal. The positioning holes (11,21, 31) in the holding panels (10,20,30) correspond to each other and align with a hexagonal positioning hole (71) defined in the base (70) of the conveyer. The positioning hole (11,21,31) has a diameter larger than that of the connecting end of the axle (40). In the preferred embodiment as shown in FIG. 4, the positioning hole (11,31) of the first or third holding panels (10,30) has an upper edge abutting with the axle (40) and a lower edge separated from the axle (40) with a gap. The positioning hole (21) of the second holding panel (20) has a lower edge abutting with the axle (40) and an upper edge separated from the axle (40) with a gap.

The securing hole (12,22,32) is defined through the holding panel (10,20,30), and the securing holes (10,20,30) in the holding panels (10,20,30) align with each other.

In addition, at least one pair of male-female combination is defined between each pair of adjacent holding panels (10,20, 30). In the preferred embodiment, two male-female combinations are defined between each pair of adjacent holding panels (10,20,30). Each combination comprises a convex protrusion (13,33) and a concave cavity (23,24). The convex protrusion (13,33) is formed on and protrudes from one of the adjacent holding panels (10,20,30), and the concave cavity (23,24) is defined in the other one holding panel (10,20,30) and holds the convex protrusion (13,33) inside. In the preferred embodiment, the convex protrusion (13,33) is formed on the first or third holding panel (10,30), and the concave cavity (23,24) is defined in the second holding panel (20). The two convex protrusions (13,33) on the first or third holding panel (10,30) are arranged along a diagonal of the securing hole (12,32) in the corresponding holding panel (10,30).

The concave cavities (23,34) in the second holding panels (20) are arranged respectively along two diagonals of the securing hole (22) in the second holding panel (20) and correspond respectively to the convex protrusions (13,33) on the first and third holding panel (10,30).

In addition, a distance between an uppermost one pair of the at least one male-female combination and the positioning hole (11,21,31) in one of a corresponding pair of adjacent holding panels (10,20,30) is different that between the uppermost pair of male-female combination and the positioning hole (11,21,31) in the other holding panel (10,20,30) of the pair of adjacent holding panels (10,20,30). For example, with reference to FIG. 2, the distance D1 between the uppermost convex protrusion (13) and the positioning hole (11) in the first holding panel (10) is smaller than the distance D3 between the corresponding concave cavity (23) and the positioning hole (21) in the second holding panel (20). The distance D4 between the uppermost convex protrusion (33) and the positioning hole (31) in the third holding panel (30) is smaller than the distance D2 between the corresponding concave cavity (24) and the positioning hole (21) in the second holding panel (20). This means that D1 is not equal to D3, and D2 is not equal to D4.

The fastener is mounted through the aligning securing holes (12,22,32) in the holding panels (10,20,30) and comprises a bolt (50) and a nut (60).

The bolt (60) is mounted through the securing holes (12, 22,32) in the holding panels (10,20,30). The nut (60) is screwed with the bolt (50) and abuts with one of the holding panels (10,20,30), the third holding panel (30) as shown. The bolt (50) of the fastener has a rectangular block (51) formed on the bolt (50) at one end away from the nut (60) to fit with a rectangular hole (72) defined in the base (70) of the conveyer.

To connect the roller (81) to the base (70) with the roller mount, the connecting end of the axle (40) is mounted through the positioning holes (11,21,31,71) in the base (70) and the holding panels (10,20,30). Then, the bolt (60) of the fastener is mounted through the hole (72) in the base (70) and the securing holes (12,22,32) in the holding panels (10,20,30) and is screwed with the nut (60). With different distances between the male-female combinations and the positioning holes (11,21,31) in the holding panels (10,20,30), the upper edges and lower edges of the positioning panels (11,21,31) alternatively abut against the outer surface of the connecting end of the axle (40) as shown in FIG. 4. Accordingly, the connecting end of the axle (40) is securely squeezed between the edges of the positioning holes (11,21,31), such that the holding effect provided to the axle (40) by the holding panels (10,20,30) is excellent. The axle (40) is not easily detached or escaped from the positioning holes (11,21,31) of the holding panels (10,20,30) even a large force or vibration applied to the axle (40) or the roller (81). Because only a single fastener is needed for the roller mount, to assemble or disassemble the roller mount is easy and convenient.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A roller mount for a roller of a conveyer comprising:
an axle having a connecting end with a polygonal cross section and adapted to rotatably connected with the roller;
multiple holding panels mounted around the connecting end of the axle and each having
a positioning hole defined through the holding panel, being polygonal corresponding to the cross section of the connecting end and having a diameter larger than that of the connecting end of the axle; and
a securing hole defined through the holding panel, wherein the securing holes in the holding panels align with each other; and
a fastener mounted through the aligning securing holes in the holding panels, wherein
at least one pair of male-female combination is defined between each pair of adjacent holding panels;
a distance between an uppermost one pair of the at least one male-female combination and the positioning hole in one of a corresponding pair of adjacent holding panels is different that between the uppermost pair of male-female combination and the positioning hole in the other holding panel of the pair of adjacent holding panels.

2. The roller mount as claimed in claim 1, wherein the positioning hole in each holding panel is hexagonal.

3. The roller mount as claimed in claim 2, wherein
the roller mount has three holding panels including a first holding panel, a second holding panel and a third holding panel;
the second holding panel is mounted and squeezed between the first and third holding panels;
the positioning hole of each one of the first and third holding panels has an upper edge abutting with the axle and a lower edge separated from the axle with a gap; and
the positioning hole of the second holding panel has a lower edge abutting with the axle and an upper edge separated from the axle with a gap.

4. The roller mount as claimed in claim 3, wherein two male-female combinations are defined between the first and second holding panels and each combination comprises
a convex protrusion formed on and protruding from one of the first and second holding panels; and a concave cavity defined in the other one of the first and second holding panels and holding the convex protrusion inside.

5. The roller mount as claimed in claim 4, wherein the convex protrusions of the male-female combination between the first and second holding panels are formed on the first holding panel and are arranged along a diagonal of the securing hole in the first holding panel; and the concave cavities of the male-female combination between the first and second holding panels are defined in the second holding panel, are arranged along a diagonal of the securing hole in the second holding panel and correspond respectively to the convex protrusions on the first holding panel.

6. The roller mount as claimed in claim 5, wherein two male-female combinations are defined between the second and third holding panels and each combination comprises a convex protrusion formed on and protruding from one of the second and third holding panels; and a concave cavity defined in the other one of the second and third holding panels and holding the convex protrusion inside.

7. The roller mount as claimed in claim 6, wherein the convex protrusions of the male-female combination between the second and third holding panels are formed on the third holding panel and are arranged along a diagonal of the securing hole in the third holding panel; and the concave cavities of the male-female combination between the second and third holding panels are defined in the second holding panel, are arranged along a diagonal of the securing hole in the second holding panel and correspond respectively to the convex protrusions on the third holding panel.

8. The roller mount as claimed in claim 7, wherein the fastener comprises a bolt mounted through the securing holes in the holding panels; and a nut screwed with the bolt and abutting with one of the holding panels.

9. The roller mount as claimed in claim 8, wherein the bolt of the fastener has a rectangular block formed on the bolt at one end away from the nut.

10. The roller mount as claimed in claim 1, wherein the roller mount has three holding panels including a first holding panel, a second holding panel and a third holding panel;

the second holding panel is mounted and squeezed between the first and third holding panels;

the positioning hole of each one of the first and third holding panels has an upper edge abutting with the axle and a lower edge separated from the axle with a gap; and the positioning hole of the second holding panel has a lower edge abutting with the axle and an upper edge separated from the axle with a gap.

11. The roller mount as claimed in claim 10, wherein two male-female combinations are defined between the first and second holding panels and each combination comprises a convex protrusion formed on and protruding from one of the first and second holding panels; and a concave cavity defined in the other one of the first and second holding panels and holding the convex protrusion inside.

12. The roller mount as claimed in claim 11, wherein the convex protrusions of the male-female combination between the first and second holding panels are formed on the first holding panel and are arranged along a diagonal of the securing hole in the first holding panel; and the concave cavities of the male-female combination between the first and second holding panels are defined in the second holding panel, are arranged along a diagonal of the securing hole in the second holding panel and correspond respectively to the convex protrusions on the first holding panel.

13. The roller mount as claimed in claim 10, wherein two male-female combinations are defined between the second and third holding panels and each combination comprises a convex protrusion formed on and protruding from one of the second and third holding panels; and a concave cavity defined in the other one of the second and third holding panels and holding the convex protrusion inside.

14. The roller mount as claimed in claim 13, wherein the convex protrusions of the male-female combination between the second and third holding panels are formed on the third holding panel and are arranged along a diagonal of the securing hole in the third holding panel; and the concave cavities of the male-female combination between the second and third holding panels are defined in the second holding panel, are arranged along a diagonal of the securing hole in the second holding panel and correspond respectively to the convex protrusions on the third holding panel.

15. The roller mount as claimed in claim 1, wherein the fastener comprises a bolt mounted through the securing holes in the holding panels; and a nut screwed with the bolt and abutting with one of the holding panels.

16. The roller mount as claimed in claim 15, wherein the bolt of the fastener has a rectangular block formed on the bolt at one end away from the nut.

* * * * *